US008924986B2

(12) United States Patent
Kothandapani et al.

(10) Patent No.: US 8,924,986 B2
(45) Date of Patent: Dec. 30, 2014

(54) METHODS, DEVICES AND COMPUTER PROGRAM PRODUCTS FOR CONFLUENCE OF MULTIPLE OPERATING SYSTEMS

(75) Inventors: Govind Kothandapani, Snellville, GA (US); Vinothkumar Sundaramoorthy, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 385 days.

(21) Appl. No.: 13/223,473

(22) Filed: Sep. 1, 2011

(65) Prior Publication Data

US 2013/0061250 A1 Mar. 7, 2013

(51) Int. Cl.
G06F 3/00 (2006.01)
G06F 9/44 (2006.01)
G06F 9/46 (2006.01)
G06F 13/00 (2006.01)
G06F 9/54 (2006.01)
G06F 9/455 (2006.01)

(52) U.S. Cl.
CPC *G06F 9/44* (2013.01); *G06F 9/545* (2013.01); *G06F 9/45537* (2013.01); *G06F 9/4411* (2013.01)
USPC .......................................................... 719/320

(58) Field of Classification Search
USPC .......................................................... 719/320
See application file for complete search history.

(56) References Cited

U.S. PATENT DOCUMENTS

| 6,996,828 B1* | 2/2006 | Kimura et al. ............... 719/319 |
| 2004/0123103 A1 | 6/2004 | Risan et al. |
| 2005/0015702 A1 | 1/2005 | Shier et al. |
| 2006/0150183 A1* | 7/2006 | Chinya et al. ............... 718/100 |
| 2009/0083630 A1 | 3/2009 | Peterson |
| 2010/0107163 A1* | 4/2010 | Lee ................................ 718/1 |
| 2011/0093836 A1* | 4/2011 | Galicia et al. ............... 717/139 |

OTHER PUBLICATIONS

Architecture of Windows NT, http://en.wikipedia.org/wiki/Architecuture_of_Windows_NT.
Android Architecture, http://blog.zeustek.com/2010/11/11/android-archtecture.
Ammann, Paul T., "Windows 2000 Architecture", www.informit.com/articles (Apr. 13, 2001).
Wright, Maury, "Why Android Deserves a Look in Embedded Wireless Systems", www.digikey.com.
Levent-Levi, Tsahi, "iOS, Android, Windows Phone 7 and the Great Changes in the Operating Systems Market", http://blog.radvision.com/voipsurvivor (Oct. 7, 2010).
BlueStacks: app player for Windows; Technology. 2013.

* cited by examiner

*Primary Examiner* — Andy Ho
*Assistant Examiner* — Timothy A Mudrick
(74) *Attorney, Agent, or Firm* — Gardner Groff Greenwald & Villanueva, P.C.

(57) ABSTRACT

Applications of multiple operating systems are provided with access to hardware resources within a mobile device. An application associated with a primary operating system is provided with access to at least some of the hardware resources via a driver running within a kernel of the primary operating system. An application associated with a secondary operating system is also provided with access to at least some of the hardware resources via the driver running within the kernel of the primary operating system.

12 Claims, 6 Drawing Sheets

METHODS, DEVICES AND COMPUTER PROGRAM PRODUCTS FOR CONFLUENCE OF MULTIPLE OPERATING SYSTEMS

TECHNICAL FIELD

The present disclosure relates generally to computing systems, and more particularly, to providing multiple operating systems with hardware access on a mobile device.

BACKGROUND

A mobile operating system (OS), also known as a mobile OS, a mobile platform, or a handheld operating system, is the operating system that controls a mobile device or information appliance. A mobile OS is similar in principle to an operating system, such as Windows, Mac OS, or Linux that controls a desktop computer or laptop. However, a mobile OS is currently somewhat simpler and deals more with the wireless versions of broadband and local connectivity, mobile multimedia formats, and different input methods compared with a desktop/laptop OS.

Typical examples of devices running a mobile operating system are smartphones, personal digital assistants (PDAs), tablet computers and information appliances, e.g., smart devices, which may also include embedded systems, or other mobile devices and wireless devices.

In today's world, having dual mobile operating systems in devices, such as laptops, has become more common as people want to have best of both worlds. Windows has been the primary operating systems for most of these laptops along with any linux based operating systems. Recently, with the increase in popularity of Android in smartphones, the trend is towards pushing Android as the secondary operating systems in notebooks and netbooks. Since Android has the advantage of a mature application market, along with developer support, there is an increasing push from the market to run Android in parallel with Windows. While there have been attempts to run multiple operating systems on personal communication devices, such attempts are cumbersome and suffer from poor performance.

It is with respect to these and other considerations that the disclosure presented herein has been made.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

According to one embodiment, a method provides multiple operating systems with access to hardware resources within a mobile device including a processor. The method includes running, via the processor, a kernel of a primary operating system and running a driver within the kernel of the primary operating system. The method further includes providing at least one application associated with the primary operating system with access to at least some of the hardware resources via the driver running within the kernel of the primary operating system and providing at least one application associated with a secondary operating system with access to at least some of the hardware resources via the driver running within the kernel of the primary operating system.

According to another embodiment, a computing system within a mobile device includes a memory configured to store applications, services, a primary operating system, a secondary operating system, and at least one device driver. The computing system further includes a processor coupled to the memory. The processor is configured to execute the applications and services, the first operating system, the secondary operating system, and the driver. The processor is configured to performs acts including running the driver within a kernel of the primary operating system, providing at least one application associated with the primary operating system with access to the memory and other hardware resources via the driver running within the kernel of the primary operating system, and providing at least one application associated with the secondary operating system with access to the memory and other hardware resources via the driver running within the kernel of the first operating system.

According to another embodiment, a computer program product within a mobile device includes a storage medium upon which instructions are recorded that, when executed by a processor, cause the processor to perform acts. The acts include running a kernel of a primary operating system, running a driver within the kernel of the primary operating system, and providing at least one application associated with the primary operating system with access to at least some of the hardware resources via the driver running within the kernel of the primary operating system. The acts further include providing at least one application associated with secondary operating system with access to at least some of the hardware resources via the driver running within the kernel of the primary operating system.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Computer operating systems are typically built upon a layered approach. One advantage of the layered operating structure is that each layer of code is given access only to the layer below it. This structure also allows the operating system to be debugged, starting at the lowest layer and adding one layer at a time until the whole system works correctly. Layering also makes it easier to enhance the operating system; one entire layer can be replaced without affecting other parts of the operating system.

Computer operating systems provide different levels of access to resources to different layers. A protection ring is one of two or more hierarchical levels or layers of privilege within the architecture of a computer system. This is generally hardware-enforced by some CPU architectures that provide different CPU modes at the hardware or microcode level. Rings are arranged in a hierarchy from most privileged (most trusted, usually numbered zero) to least privileged (least trusted, usually with the highest ring number). In most operating systems, Ring 0 is the level with the most privileges and interacts most directly with the physical hardware, such as the CPU and memory.

Figure 1:
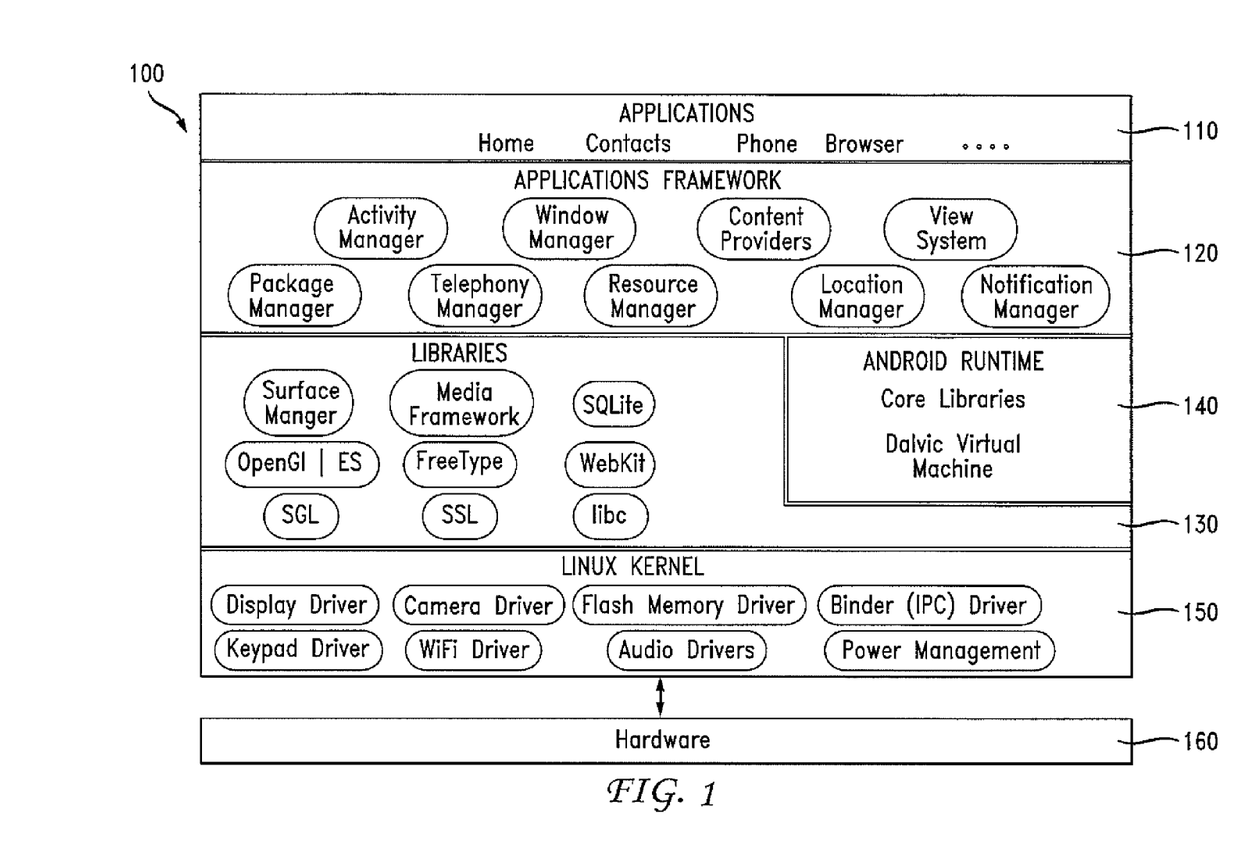
FIG. 1 illustrates a conventional Android architecture for mobile devices.

FIG. 1 is a diagram of a conventional Android architecture for mobile devices. The Android architecture 100 depicted in FIG. 1, which may be included within a mobile device, includes a software stack including an applications layer, an application framework layer, a libraries layer 140, a runtime layer, and a kernel layer 150. The applications layer 110 may be considered to be the least privileged layer, residing in Ring 3. The application framework layer 120 runs in Ring 2, having more privileges. The libraries/Android runtime layer 130, 140 runs in Ring 1, having even more privileges. The kernel 150 runs in Ring 0 and has the most privileges.

The applications layer 110 includes various applications, which may be written in JAVA. These applications, include, e.g., a calendar, a contacts list, an email client, SMS program maps, a phone application, a web browser application, etc.

The application framework 120 is used by developers to access framework application programming interfaces (APIs) and manage the basic functions of the mobile device, such as resource allocation, switching between processes or programs, telephone applications, and keeping track of the mobile device's physical location. The application framework includes various managers, including an activity manager, a window manager, a content provider manager, a view system manager, a package manager, a telephony manager, a resource manager, a location manager, and a notification manager.

The library layer 130 includes libraries written, e.g., in C, C++, etc., and is used by various systems. The libraries instruct the mobile device how to handle different kinds of data and are exposed to Android developers via the application framework 120. Libraries may include, e.g., a surface manager, a media framework library, an SQLite library, an Open GL/ES library, a Free Type library, a WebKit library, an SGL library, an SSL library, and an libc library.

The Android runtime layer 140, which includes a set of core libraries and a Dalvik Virtual Machine (DVM), is also located in the library layer 130. The runtime layer 140 includes the set of base libraries that are required for Java libraries. Every Android application gets its own instance of Dalvik virtual machine. Dalvik has been written so that a device can run multiple virtual machines efficiently with minimal memory.

The Linux kernel layer 150 includes Android memory management programs, security settings, power management software and several drivers for hardware, file system access, networking, and inter-process-communication. The kernel 150 also acts as an abstraction layer between the hardware 160 and the rest of the software stack.

The hardware layer 160 includes physical hardware including, e.g., a hard drive for storing data, a processor for executing applications, and a memory which may include an operating system which controls scheduling of tasks and access to system resources.

Figure 2:
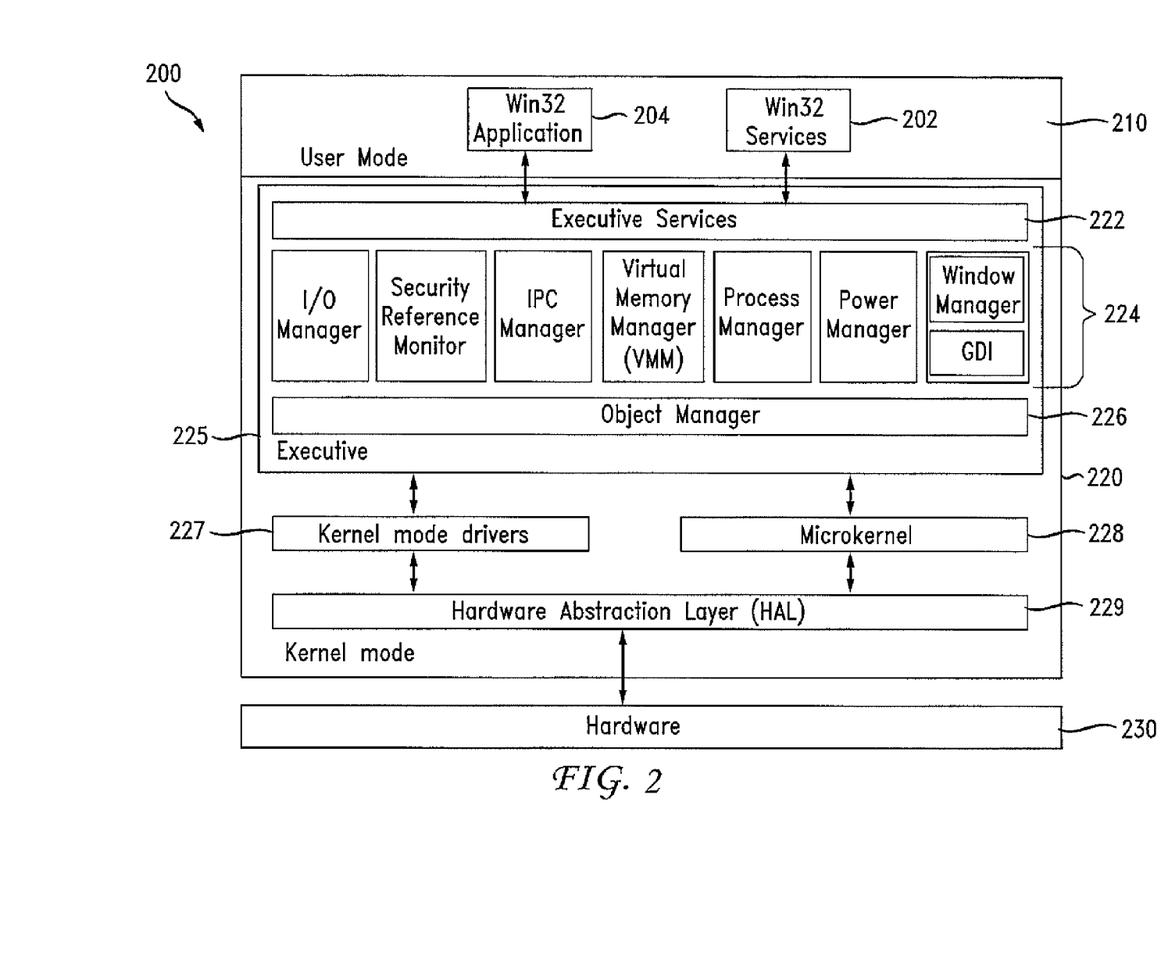
FIG. 2 illustrates a conventional Windows architecture for mobile devices.

FIG. 2 illustrates an exemplary conventional Windows architecture for a mobile device. The Windows architecture shown in FIG. 2 represents a Windows 2000 operating system. However, it should be appreciated that the other versions of Windows are contemplated. The Windows architecture 200, which may be included within a mobile device, operates in two modes. These two modes are represented in FIG. 2 as the kernel mode 220 and the user mode 210. The components in the user mode are considered to reside in Ring 3, the least privileged. The components in the kernel mode are in Ring 0, the most privileged.

The user mode 210 has four primary responsibilities: special system support processes, services that are server processes, environment subsystems, and user applications. The special support processes include, e.g., the logon process and the session manager. The services that are server processes, include, e.g., the event Log and schedule services. The environment subsystems provide an operating system environment by exposing the native operating system services to user applications.

The user mode includes user applications, such as Win32 applications 204 as illustrated. The user applications may also include various other types of applications, e.g., Windows 3.1, MS-DOS, POSIX, OS/2 applications, etc. The applications 204 may include applications similar to the applications shown in FIG. 1, e.g., various user applications, such as camera applications, a phone application, a browser application etc.

The user mode 210 also includes services, such as Win32 services 202. The services may also include other types of services, e.g., Windows 3.1, MS-DOS, POSIX, OS/2 services, etc. The services 202 may be considered special types of applications that may be started automatically at system boot, e.g., event logging and scheduling. The services 202 provide application programming interfaces (APIs) that are specific to the Windows operating system.

Some applications and services in the user mode 210 form a client/server relationship, in which the applications are the clients, and the services are the servers. One of the benefits of this type of architecture is that support for other types of applications can be provided by simply adding subsystems. Other applications communicate directly with the executive layer.

In the user mode, software is not able to access hardware directly. Access to hardware is provided to the user mode 210 via the kernel mode 220. In the kernel mode 220, software is able to access the hardware and system data, as well as access all other system resources.

The kernel mode 220 has the following components: executive 225, microkernel 228, kernel mode driver 227, and Windows hardware abstraction layer (HAL) 229.

The executive layer 225 contains executive services 222, executive components 224, and an object manager 226. The executive services 222 provide Application Programming Interfaces (APIs) for accessing the executive components 224. Both Win32 applications 201 and Win32 services 202 use the executive services 222 to access the I/O manager, process manager, and other executive components.

The executive components 224 contain components that implement memory management, process and thread management, security, I/O, interprocess communication, and other base operating system services. For the most part, these components interact with one another in a modular, layered fashion.

As shown in FIG. 2, the executive components 224 include an I/O system manager that is responsible for dispatching all system I/O requests, and a security reference monitor that is responsible for controlling which objects have permissions to which resources. Each object has an Access Control List (ACL) that is queried when the object makes a service request. Access to resources is allowed or disallowed according to the rights the module has in the ACL.

The executive components 224 also include a Local Procedure Call (LPC) manager that handles inter-process communications used to pass messages between processes, and a Virtual Memory Manager (VMM) that manages the virtual address space of each process, shares memory between processes, and protects each process's virtual memory. All I/O devices, network ports, printers, drives, and so on are mapped to virtual files. These virtual files are referred to as file objects and are managed by the object manager 226 just like any other object.

The executive components 224 also include process manager that sees processes as objects. Its responsibility is to create and terminate processes and threads. It also suspends and resumes the execution of threads, and stores and retrieves information about processes and threads.

The executive components 224 also include a Pnp manager that handles plug and play and supports device detection and installation at boot time and a power manager that deals with power events and notifies affected drivers.

The executive components 224 further include a windows manager and a Graphic Device Interface (GDI) that provide the graphic user interface (GUI). The windows manager controls the placement and appearance of windows within a windowing system in a graphical user interface. The GDI handles tasks, such as drawing lines and curves, rendering fonts, and handling palettes.

Although not shown, the executive components 224 may also include additional components, e.g., a cache manager. The cache manager improves the performance of file-based I/O by causing recently referenced disk data to reside in main memory for quick access. It also defers disk writing by holding the updates in memory for a short time before sending them to disk.

The object manager 226 handles calls from other executive subject systems, especially system calls. System calls pass through the object manager to gain access to Winnows resources. The object manager 226 creates, manages, and deletes executive objects. Executive objects are created in the executive layer 225 and are accessible to the executive and protected subsystems. They can be thought of as message packets that represent items such as processes, threads, semaphores, and other low-level objects.

The microkernel 228 sits between the executive layer 225 and the Windows HAL 229 and provides multiprocessor synchronization, thread and interrupt scheduling and dispatching, and trap handling and exception dispatching. During system startup, it extracts information from the registry, such as which device drivers to load and in what order.

The hardware abstraction layer 229 includes code associated with the Windows operating system that changes with the hardware that the operating system is being run on. Thus, it is compatible with multiple processor platforms. The hardware abstraction layer 229 manipulates the hardware 230 directly.

The hardware layer 230 includes physical hardware including, e.g., a hard drive for storing data, a processor for executing applications, and a memory which may include an operating system which controls scheduling of tasks and access to system resources.

The kernel mode device drivers 227 enable the kernel layer 220 to interact with the hardware layer 230. Each of the drivers has well defined system routine and interval routes that it exports to the rest of the operating system. The kernel mode drivers 227 send and receive load parameters and configuration data from the registry.

While the Android architecture and Windows architecture described above are useful for mobile devices for different reasons, there has been a push to have multiple operating systems on a single mobile device. Several attempts have been made to accomplish this.

One approach is to run an Android operating system as a second operating system on a mobile device that is running a Windows operating system. To use this approach, the user needs to shut down Windows to boot Android (and vice versa). This rebooting takes a few minutes, depending on the processor. This rebooting time is cumbersome for the user. Also, this approach requires that drivers be developed separately for Android and Windows, which adds to development costs (which are ultimately passed on to the consumer).

Another approach involves running Android using virtualization technology. While virtualization is a common approach, not all processors have virtualization capability built in. Also, this approaches results in low processor performance.

Yet another approach involves switching between operating systems using S3 technology. This approach has the drawback of having only one operating system running at a time. Also, this approach requires heavy memory usage and BIOS customizations. In addition, this approach requires that drivers be developed separately for Android and Windows.

Another approach involves Dalvik virtualization. This approach has the drawback that applications may not be 100% compatible. Also, this approach would require a lot of changes for every new Android release.

Figure 3:
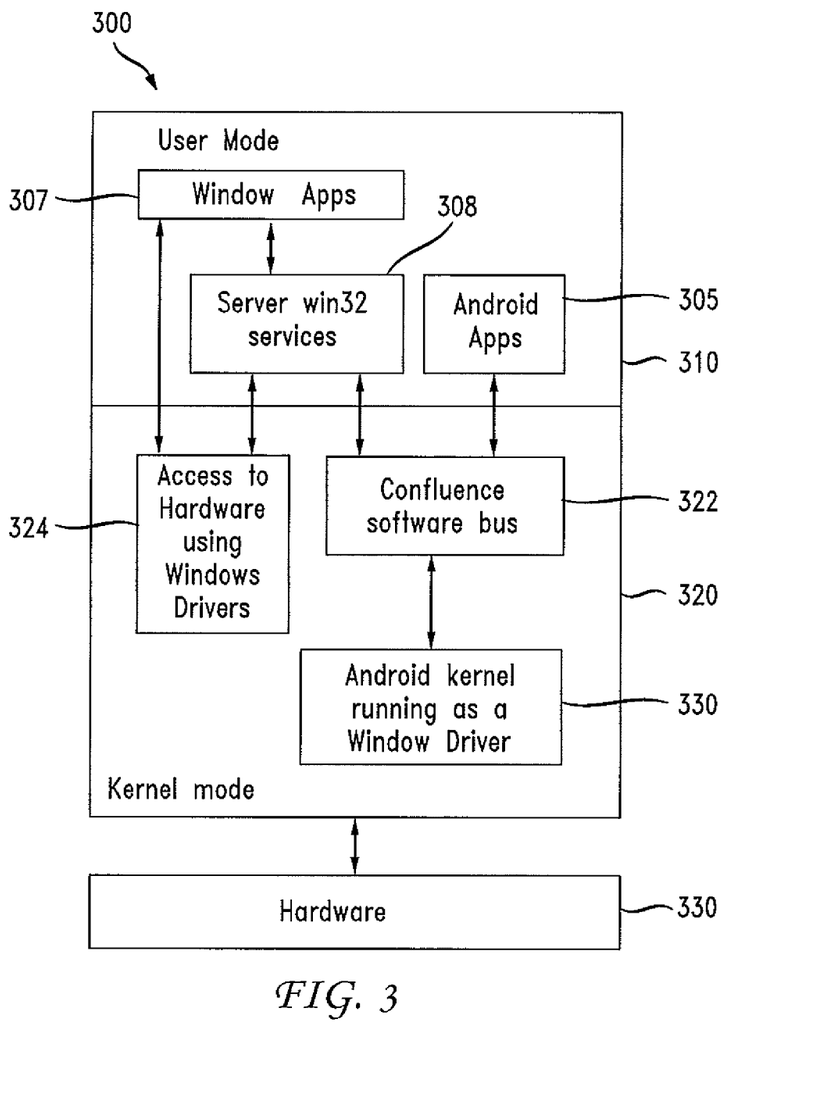
FIG. 3 illustrates an architecture for running dual operating systems within a mobile device according to an exemplary embodiment.

FIG. 3 illustrates an architecture for running dual operating systems in a mobile device according to an exemplary embodiment. Referring to FIG. 3, the architecture 300, which may be included in a mobile device, includes a Windows architecture similar to that shown in FIG. 2 with enhancements for running an Android operating system. It should be appreciated that in the diagram shown in FIG. 3, several elements of the Windows architecture have been omitted for simplicity of illustrations. Although various elements of the Windows architecture are not shown, such elements are considered part of the architecture of the system shown in FIG. 3.

The architecture 300 includes software architecture having a user mode layer 310 and a kernel mode layer 320. The components in the user mode 310 may be considered to reside in Ring 3, the least privileged. The components in the kernel mode 320 may be considered to run in Ring 0, the most privileged.

In the user mode, software is not able to access hardware directly. The user mode 310 includes Window applications 307, Android Applications 305 and Windows services, e.g., Win32 services 308 Windows 3.1, MS-DOS, POSIX, OS/2 services, etc. The Windows applications 307 may include various applications, e.g., a camera application, a browser application (e.g., Explorer), a phone application, Notepad, etc. The Windows applications 307 may include Win32 applications, Windows 3.1, MS-DOS, POSIX, OS/2 applications, etc. The Android applications 305 may also include various applications, e.g., a camera application, a browser application, a phone application, etc.

The hardware layer 330 includes physical hardware including, e.g., a hard drive for storing data, a processor for executing applications, and a memory which may include code for running a Windows operating system to control scheduling of tasks and access to system resources, along with code for executing other software represented in FIG. 3.

Access to hardware is provided to the user mode 310 via the kernel mode 320. In the kernel mode 320, the software is able to access the hardware and system data, as well as access all other system resources.

The kernel mode device drivers 324 enable the kernel layer 320 to interact the hardware layer 330. Also, a driver 326 is provided for running the Android kernel. Thus, according to exemplary embodiments, the Android OS runs as a Windows driver in the kernel mode 320.

In the user mode 310, Windows applications 307 may access the kernel mode 320 directly via the Windows driver 324 or indirectly via the Win32 services 308, depending on the application. For example, modem application may directly access the modem via the Windows driver 324, while general Windows applications may access the keyboard using the Win32 services 308 to dispatch keyboard inputs. Requests for access from the Android applications 305 are communicated to the Windows services 308 via a confluence software bus 322. The Windows services 308 sends the request to a Windows driver 324 which accessing the hardware 330 through a HAL (not shown for simplicity of illustration). The requested hardware resources are then provided to the Android applications 305 via the driver 324, the Windows services 308, and the confluence software bus 326.

Android application requests that need to be fulfilled by the Android operating system are sent to ether Android kernel running as a windows driver 326 via the confluence software bus 322. The Android kernel 326 fulfills the request that needs to be handled by the Android OS and provides the fulfilled request to the Android applications 305 via the confluence software bus 322.

As an example of how the architecture shown in FIG. 3 may work, consider a camera application. If the camera application is accessed via Windows, the Windows camera application requests the camera driver included in the Windows drivers 324 for a picture. The camera driver access the actual camera in the hardware layer 330 and provides the picture to the requesting application. If the camera application is accessed via Android, the Android camera application requests the camera hardware layer for a picture, and the request is routed to the camera server services included in the Windows services 308 via the confluence software bus 322. A Windows camera server service included within the Windows services 308 requests the Windows camera driver for a picture. The camera driver accesses the actual camera and provides the pictures to the Windows camera services. The Windows camera service sends the picture to the Android camera application via the confluence software bus 322.

Figure 4:
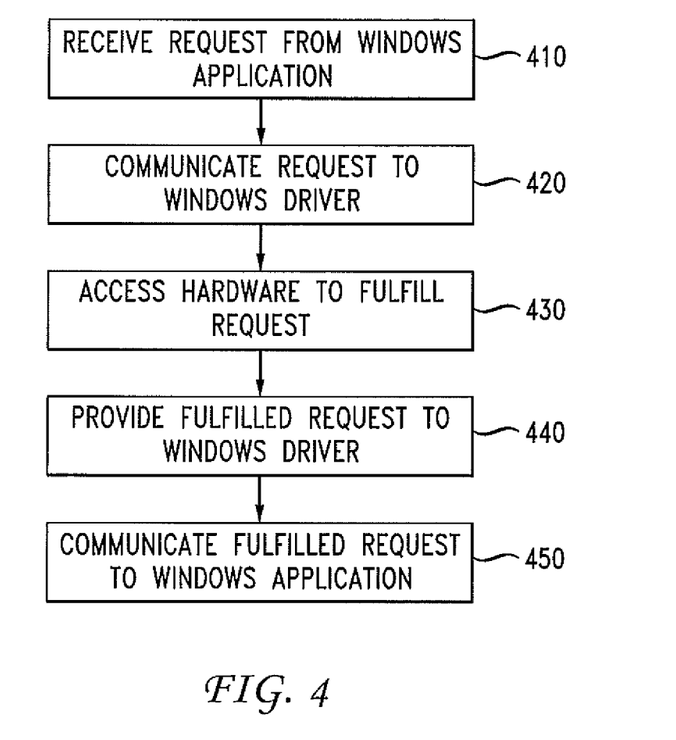
FIG. 4 illustrates a method for fulfilling a request of a primary operating system according to an exemplary embodiment.
Figure 5:
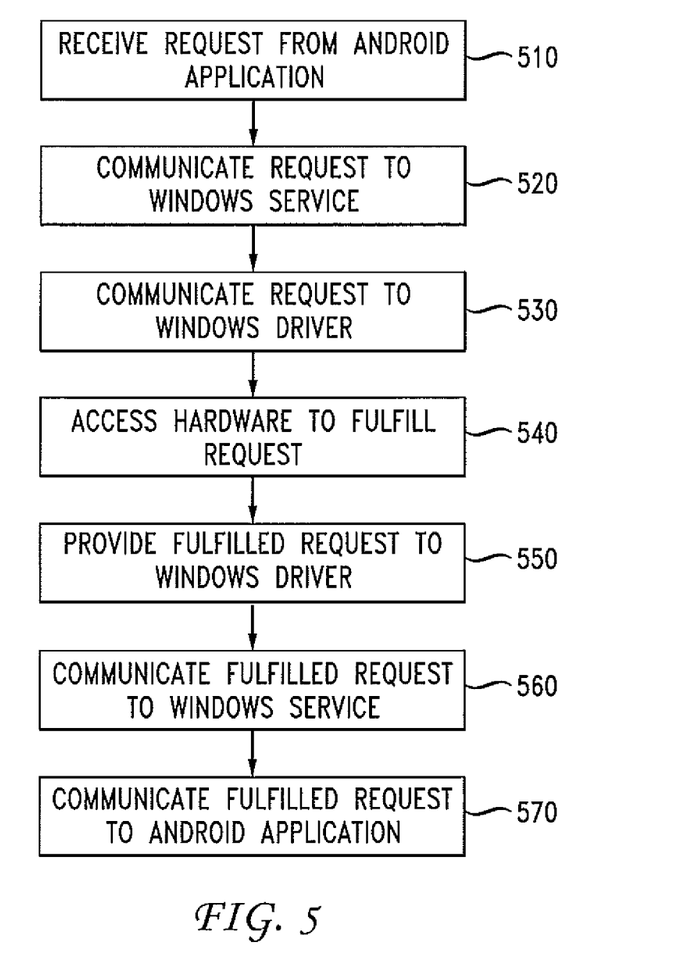
FIG. 5 illustrates a method for fulfilling a request of a secondary operating system according to an exemplary embodiment.

According to an exemplary embodiment, the architecture 300 may be included in a mobile device, such as a mobile phone. However, the architecture may also be included in other devices, e.g., a workstation, a telephone, a desktop computer, a laptop, a notebook computer, a server, a handheld computer, a media playing device, a gaming system, a mobile computing device, or any other type and/or form of computing, telecommunications, or media device that is capable of communication FIGS. 4 and 5 are flow charts illustrating methods for providing access to hardware resources in a mobile device according to an exemplary embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

FIG. 4 illustrates a method for handling a request for hardware access from an application associated with a primary operating system, e.g., a Windows operating system. Referring to FIG. 4, a request is received from an application, associated with a primary operating system, e.g., a Windows application 307, at step 410. At step 420, the request is communicated to a driver running within a kernel of the primary operating system, e.g., the driver 324. Although not shown, it should be appreciated that the request may instead be communicated to a service included, e.g., in the services 308, and then communicated to the driver 324, depending on the type of application. At step 430, hardware is accessed via the driver to fulfill the request. At step 440, the fulfilled request is provided to the driver. At step 450, the fulfilled request is communicated to the requesting application.

FIG. 5 illustrates a method for handling a request for hardware access from an application associated with a secondary operating system, e.g., an Android operating system. Referring to FIG. 5, a request is received from an application associated with a secondary operating system, e.g., an Android application 305, at step 510. At step 520, the request is communicated to a service associated with the primary operating system, e.g., the services 308. At step 530, the request is communicated to a driver running within a kernel of the primary operating system, e.g., the driver 324. At step 540, hardware is accessed via the driver to fulfill the request. At step 550, the fulfilled request is provided to the driver associated with the primary operating system. At step 560, the fulfilled request is communicated to the requesting service associated with the primary operating system. At step 570, the fulfilled request is communicated to the requesting associated with the secondary operating system.

Figure 6:
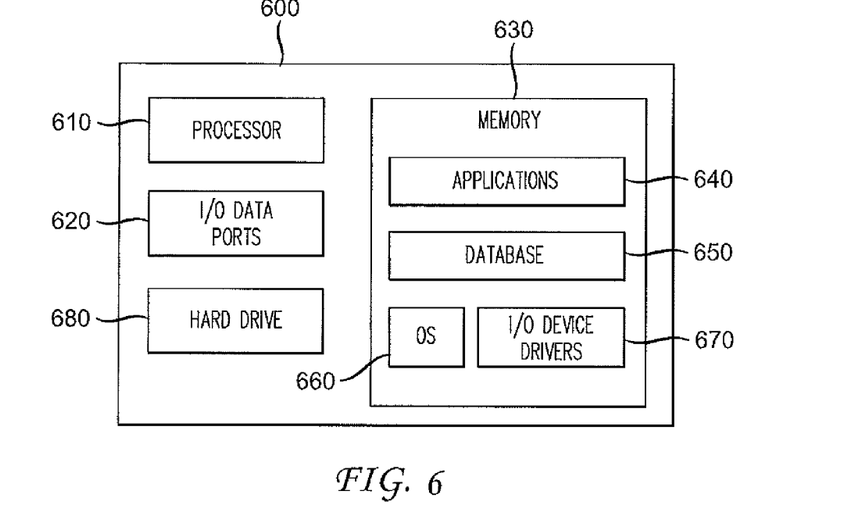
FIG. 6 is a block diagram of a computing system in which the architecture of FIG. 3 may be implemented according to exemplary embodiments.

FIG. 6 is a block diagram of a computing device 600 with which the software architecture of FIG. 3 may be implemented. The computing device 600 may be included within a mobile device. Referring to FIG. 6, the computing device 600 includes a processor 610 that receives inputs, e.g., user requests, and transmits outputs, e.g., responses to user requests via I/O Data Ports 620. The I/O Data Ports 620 can be implemented with, e.g., an interface including an antenna or other suitable type of transceiver through which data and signals may be transmitted and received wired and/or wirelessly.

The computing device 600 also includes a physical hard drive 680. The processor 610 communicates with the memory 630 and the hard drive 680 via, e.g., an address/data bus (not shown). The processor 610 can be any commercially available or custom microprocessor. The memory is 630 is representative of the overall hierarchy of memory devices containing the software and data used to implement the functionality of the device 600. The memory 630 can include, but is not limited to, the following types of devices: processor registers, processor cache, RAM, ROM, PROM, EPROM, EEPROM, flash memory, SRAMD, DRAM other volatile memory forms, and non-volatile, semi-permanent or permanent memory types; for example, tape-based media, optical media, solid state media, hard disks, combinations thereof, and the like.

As shown in FIG. 6, the memory 630 may include several categories of software and data used in the device 600, including applications 640, a database 650, an operating system (OS) 660, and input/output (I/O) device drivers 670. The memory 630 may also include services, which may consider a special category of applications 640. As will be appreciated by those skilled in the art, the OS 660 may include code for any operating system for use with a data processing system, e.g., a Windows OS, Android OS, etc.

The I/O device drivers 670 may include various routines accessed through at least one of the OS 660 by the applications 640 and services 650 to communicate with devices, and certain memory components. According to an exemplary embodiment, one of the operating systems, e.g., the Windows OS is run in kernel mode, while another operating system, e.g., the Android OS, is run as driver within the kernel of the other operating system.

The applications 640 can be stored in the memory 630 and/or in a firmware (not shown) as executable instructions, and can be executed by the processor 610. The applications 640 include various programs that implement the various features of the device 600. The database 650 represents the static and dynamic data used by the applications 640, the OS 660, the I/O device drivers 670 and other software programs that may reside in the memory.

While the memory 630 is illustrated as residing proximate the processor 610, it should be understood that at least a portion of the memory 630 can be a remotely accessed storage system, for example, a server on a communication network, a remote hard disk drive, a removable storage medium, combinations thereof, and the like. Thus, any of the data, applications, and/or software described above can be stored within the memory 630 and/or accessed via network connections to other data processing systems (not shown) that may include a local area network (LAN), a metropolitan area network (MAN), or a wide area network (WAN), for example.

It should be understood that FIG. 6 and the description above are intended to provide a brief, general description of a suitable environment in which the various aspects of some embodiments of the present disclosure can be implemented. While the description refers to computer-readable instructions, the present disclosure also can be implemented in combination with other program modules and/or as a combination of hardware and software in addition to, or instead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for providing multiple operating systems with access to hardware resources within a mobile device including a processor, comprising:

running, via the processor, a kernel of a primary operating system;

running, via the processor, at least one driver within the kernel of the primary operating system;

providing at least one application associated with the primary operating system with access to at least some of the hardware resources via the driver running within the kernel of the primary operating system; and providing at least one application associated with a secondary operating system with access to at least some of the hardware resources via the driver running within the kernel of the primary operating system, including:

receiving, at a service associated with the primary operating system, a request for access to at least some of the hardware resources, wherein the request is received from the application associated with the secondary operating system via a software bus;

communicating the request for access to at least some of the hardware resources from the service to the driver running within the kernel of the primary operating system;

fulfilling the request for access to at least some of the hardware resources;

providing the fulfilled request to the driver running within the kernel of the primary operating system;

communicating the fulfilled request to the service associated with the primary operating system; and communicating the fulfilled request from the service associated with the primary operating system to the requesting application associated with the secondary operating system via the software bus.

2. The method of claim 1, further comprising running a kernel of the secondary operating system as a driver within the kernel of the primary operating system.

3. The method of claim 1, wherein providing the application associated with the primary operating system with access to at least some of the hardware resources comprises:

receiving, at the driver, a request for access to at least some of the hardware resources from the application associated with the primary operating system; and providing access to the requested hardware resources via the driver.

4. The method of claim 1, wherein the primary operating system is a Windows based operating system, and the secondary operating system is an Android operating system.

5. A computing system within a mobile device, comprising:

a memory for storing applications, services, a primary operating system, a secondary operating system, and a plurality of drivers;

a processor coupled to the memory and configured to execute the applications and services and run the first operating system, the secondary operating system, and the driver, wherein the processor is further configured to perform operations including:

running a kernel of the primary operating system;

running a driver within the kernel of the primary operating system;

providing at least one application associated with the primary operating system with access to the memory and other hardware resources within the mobile device via the driver running within the kernel of the primary operating system; and providing at least one application associated with the secondary operating system with access to the memory and other hardware resources via the driver running within the kernel of the first operating system, including:
  receiving, at a service associated with the primary operating system, a request for access to at least some of the hardware resources, wherein the request is received from the application associated with the secondary operating system via a software bus;
  communicating the request for access to at least some of the hardware resources from the service to the driver running within the kernel of the primary operating system;
  fulfilling the request for access to at least some of the hardware resources;
  providing the fulfilled request to the driver running within the kernel of the primary operating system;
  communicating the fulfilled request to the service associated with the primary operating system; and
  communicating the fulfilled request from the service associated with the primary operating system to the requesting application associated with the secondary operating system via the software bus.

6. The computing system of claim 5, wherein the the processor is further configured to perform:
  running a kernel of the secondary operating system as a driver within the kernel of the primary operating system.

7. The computing system of claim 5, wherein providing the application associated with primary operating system with access to at least some of the hardware resources comprises:
  receiving, at the driver, a request for access to at least some of the hardware resources from the application associated with the primary operating system; and
  providing access to the requested hardware resources via the driver.

8. The computing system of claim 5, wherein the primary operating system is a Windows based operating system, and the secondary operating system is an Android operating system.

9. A computer program product within a mobile device and including a storage medium upon which instructions are recorded that, when executed by a processor, cause the processor to perform acts comprising:
  running a kernel of a primary operating system;
  running a driver within the kernel of the primary operating system;
  providing at least one application associated with the primary operating system with access to at least some of the hardware resources via the driver running within the kernel of the primary operating system; and
  providing at least one application associated with secondary operating system with access to at least some hardware resources within the mobile device via the driver running within the kernel of the primary operating system, including:
    receiving, at a service associated with the primary operating system, a request for access to at least some of the hardware resources, wherein the request is received from the application associated with the secondary operating system via a software bus;
    communicating the request for access to at least some of the hardware resources from the service to the driver running within the kernel of the primary operating system;
    fulfilling the request for access to at least some of the hardware resources;
    providing the fulfilled request to the driver running within the kernel of the primary operating system;
    communicating the fulfilled request to the service associated with the primary operating system; and
    communicating the fulfilled request from the service associated with the primary operating system to the requesting application associated with the secondary operating system via the software bus.

10. The computer program product of claim 9, wherein the instructions further cause the processor to perform:
  running a kernel of the secondary operating system as a driver within the kernel of the primary operating system.

11. The computer program product of claim 9, wherein providing the application associated with the primary operating system with access to at least some of the hardware resources comprises:
  receiving, at the driver, a request for access to at least some of the hardware resources from the application associated with the primary operating system; and
  providing access to the requested hardware resources via the driver.

12. The computer program product of claim 9, wherein the primary operating system is a Windows based operating system, and the secondary operating system is an Android operating system.

* * * * *